March 29, 1949.  I. M. KOLIN  2,465,459
REMOVABLE DRAWER-LIKE COOLING DEVICE
FOR REFRIGERATOR CABINETS Filed July 31, 1946  3 Sheets-Sheet 1

INVENTOR.
Isadore M. Kolin
BY
Barthel & Bugbee
ATT'YS

March 29, 1949.  I. M. KOLIN  2,465,459
REMOVABLE DRAWER-LIKE COOLING DEVICE
FOR REFRIGERATOR CABINETS
Filed July 31, 1946  3 Sheets-Sheet 2
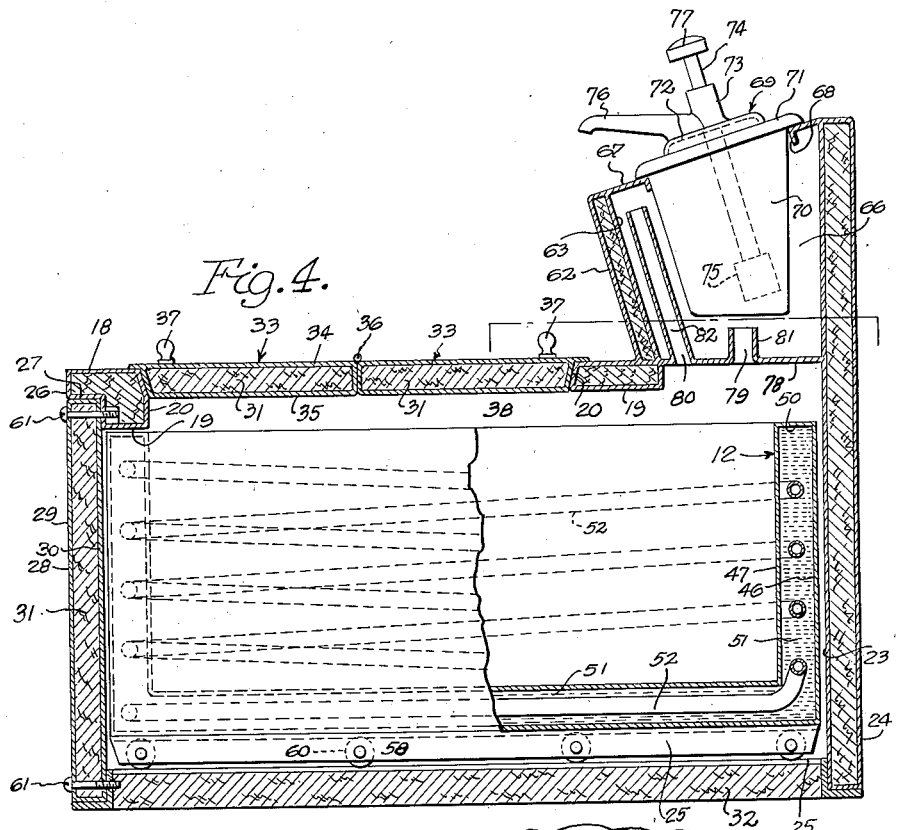
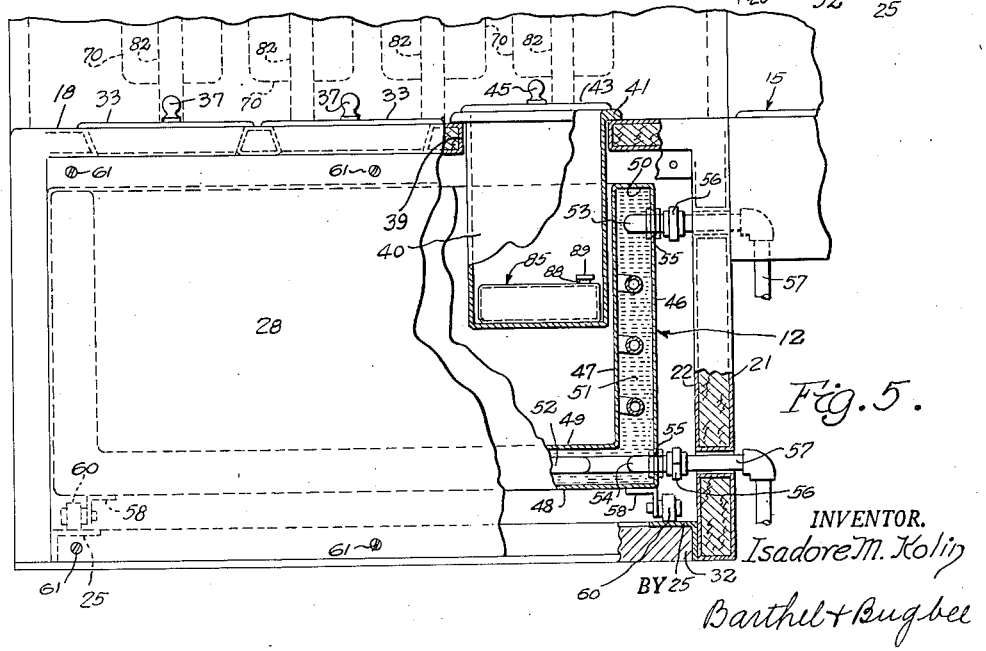
INVENTOR.
Isadore M. Kolin
BY Barthel + Bugbee
ATT'Y'S INVENTOR.
Isadore M. Kolin
BY Barthel & Bugbee
ATT'Y'S Patented Mar. 29, 1949

2,465,459

UNITED STATES PATENT OFFICE 2,465,459

REMOVABLE DRAWERLIKE COOLING DEVICE FOR REFRIGERATOR CABINETS

Isadore M. Kolin, Detroit, Mich.

Application July 31, 1946, Serial No. 687,317

2 Claims. (Cl. 62—95)

This invention relates to dispensing apparatus for ice cream products, particularly soda fountains and the like.

One object of this invention is to provide a refrigerated dispensing apparatus for ice-cream, beverages and syrups therefor wherein the syrup containers are cooled by the refrigerating unit for the ice cream compartment.

Another object is to provide a refrigerated dispensing apparatus, for ice cream, beverages and syrups, wherein the ice cream refrigerating compartment and syrup container compartments are interconnected by passageways for the transfer of cooled air therebetween.

Another object is to provide a refrigerated dispensing apparatus, for ice cream, beverages and syrups, wherein the syrup container compartment is located adjacent the ice cream refrigerating compartment so as to provide for heat transfer and exchange between them and thus to refrigerate the syrup containers and the ice cream from a common refrigerating unit.

Another object is to provide a refrigerated dispensing apparatus, for ice cream, beverages and syrup, wherein a temperature modulating device is located between the ice cream refrigerating compartment and the syrup containers, this modulating device consisting of a liquid tank adapted to evenly distribute the refrigerating action, or a dry heat conducting and distributing device.

Another object is to provide a dispensing apparatus, for ice cream, beverages and syrups, wherein a temperature modulating device contains heat retarding or insulating members to retard the conduction of heat therethrough and thereby prevent too rapid refrigeration of the syrup containers or to prevent a fall of temperature below a desired minimum temperature.

Another object is to provide a dispensing apparatus for ice cream, beverages and syrups therefor wherein the refrigerating unit is mounted upon a movable carriage so as to be quickly removable from the apparatus for servicing or repairs merely by disconnecting the supply and discharge conduits attached thereto.

Another object is to provide a dispensing apparatus for ice cream, beverages, syrups and the like having a sink associated therewith for cleaning the containers and other equipment used in connection with the dispensing of such articles, this sink being arranged to be quickly detachable and removable from the housing in which it is mounted, so as to enable rapid servicing and repair thereof.

Other objects and advantages of the invention will become apparent during the course of the following description of the accompanying drawings, wherein:

Figure 4 is a vertical section along the line 4—4 in Figure 3;

Figure 5 is an enlarged front elevation of the portion of the dispensing apparatus shown in Figure 3 with a part thereof broken away to show the refrigerating unit for the ice cream compartment and its connection;

Figure 1:
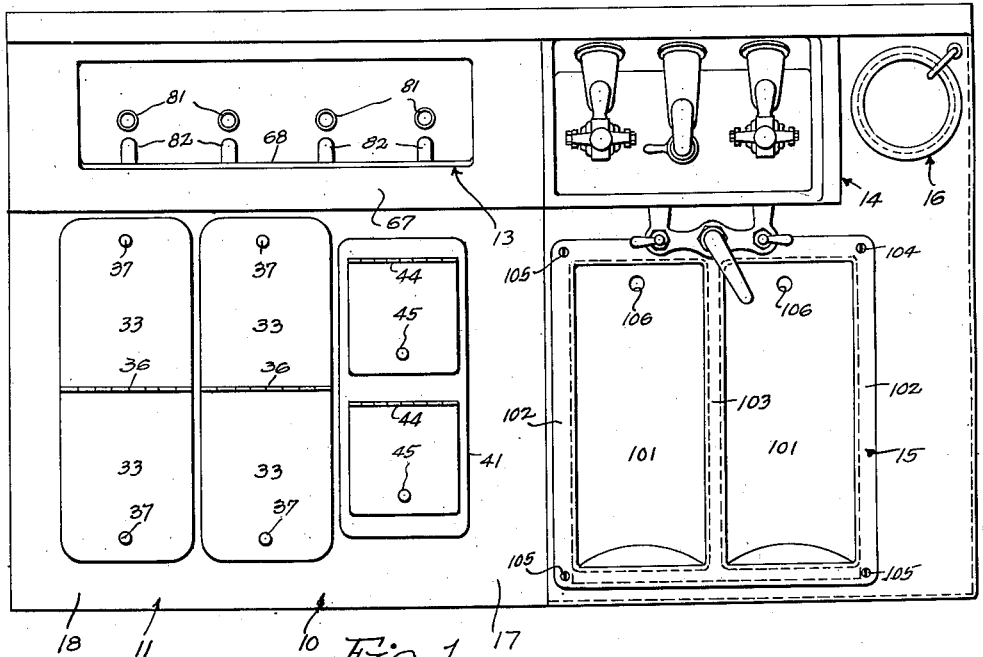
Figure 1 is a top plan view of the dispensing apparatus, according to a preferred form of the invention, with the syrup dispensing devices removed, to reveal the refrigeration compartment beneath them.

Referring to the drawings in detail, Figure 1 shows a dispensing apparatus according to a preferred form of the invention as consisting generally of a cabinet or housing 10 subdivided into an ice cream dispensing unit 11, having therein a refrigerating unit 12, a syrup-dispensing unit 13, a fountain unit 14, a sink unit 15 and a receptacle cleaning unit 16, the foregoing units being generally designated by their respective numerals. The fountain unit 14 and receptacle cleaning unit 16 are of conventional design and their details form no part of the present invention. The housing 10 is preferably constructed of sheet metal such as stainless steel, and is provided with a top portion 17 in the form of a counter having apertures into which the various units are fitted, as hereinafter described.

Ice cream dispensing unit

Figure 3:
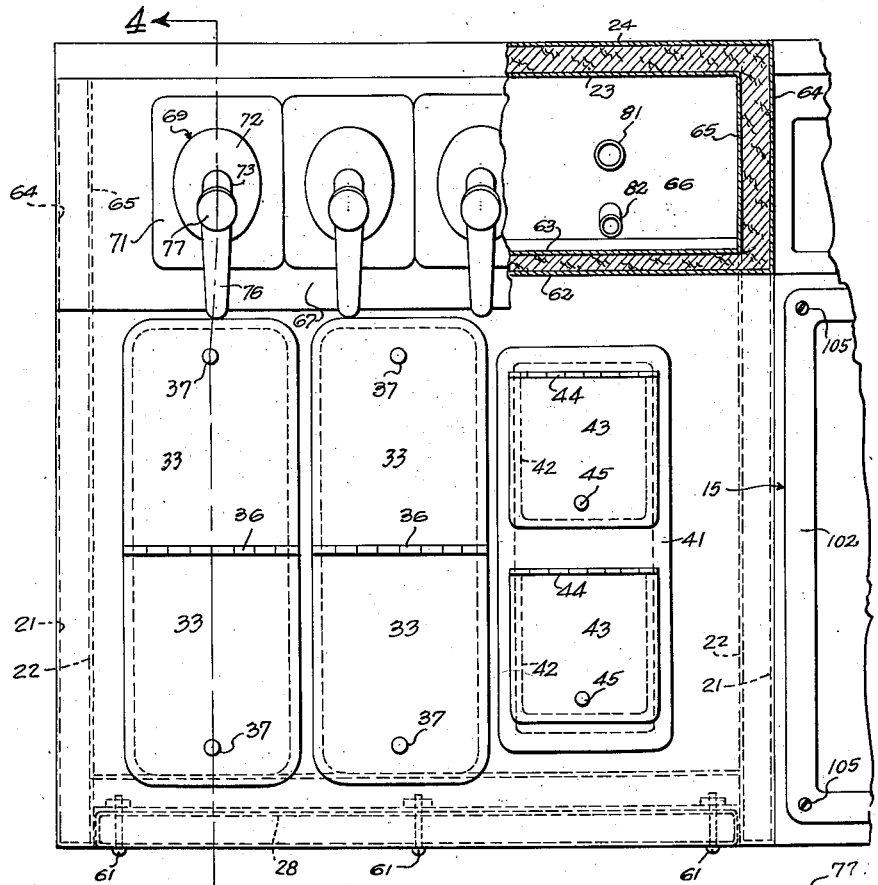
Figure 3 is an enlarged top plan view of the left-hand end of the dispensing apparatus shown in Figure 1, partly in section to show the refrigerating arrangement for the syrup compartment.

The ice cream dispensing unit 11 has a top portion 18 forming a part of the housing top portion 17, this being provided with an inner wall 19 having framed service openings 20 with inclined walls (Figure 4). The ice cream dispensing compartment 11 is also provided with outer and inner side walls 21 and 22 respectively (Figure 3), outer and inner rear walls 23, 24, a bottom guide rail 25, and a front wall 26 with a framed access opening 27 into which is fitted an access door or removable closure member 28 having outer and inner walls 29 and 30 respectively.

The spaces between the outer walls 18, 21, 23 and 29 and the inner walls 19, 22, 24 and 30 are filled with heat-insulating material 31 of any suitable and conventional type, such as cork, glass fiber or the like to retard the conduction of heat through the walls. Similarly, below the bottom guide rails 25 is mounted an insulating wall 32 of like material.

Service closure members 33 such as covers are inserted in the service openings 20 and have outer and inner walls 34 and 35 likewise containing the insulating material 31. The covers 33 have hinges 36 and handles or knobs 37 by which they may be opened and closed. The service covers 33 and service openings 20 open into a chamber 38 containing the usual cans for ice cream or the other products to be refrigerated. The top 18 also contains an opening 39 into which an elongated closed container 40 for refrigerated packaged articles is inserted and held in position by a flanged top 41. The top 41 in turn contains apertures 42 (Figure 3) closed by covers 43 hinged as at 44 to the top 41, knobs 45 being provided for lifting the covers 43.

Refrigerating unit

The chamber 38 in the ice cream dispensing unit 11 contains the removable drawer-like refrigerating unit 12 which is in the form of a hollow tank having outer and inner side walls 46 and 47, outer and inner bottom walls 48 and 49, and a top wall 50 interconnecting these outer and inner walls (Figures 4 and 5). These outer and inner walls define a compartment 51 containing a low freezing liquid such as a brine or calcium chloride solution which is maintained at a low temperature by a refrigerating coil 52 arranged therein and having refrigerant circulated therethrough from an external refrigerating apparatus (not shown) by means of the connections 53 and 54 (Figure 5). The connections 53 and 54 pass through apertures 55 in the side wall 46 and are connected by couplings 56 to pipes 57 leading to the refrigerating apparatus just mentioned. Secured to the bottom wall 48 are angle brackets 58 consisting of angle bars 59 upon which rollers 60 are rotatably mounted. The rollers 60 travel upon the upper surface of the wall 25 as a track and enable the unit 12 to be withdrawn from the chamber 38 when the couplings 56 are disconnected and the door 28 is removed by removing the fasteners 61 (Figure 4) by which they are secured to the framed opening 27.

Syrup dispensing unit

Rising from the top 18 at the rear thereof is the syrup dispensing unit 13. The latter has upwardly inclined front walls 62 and 63 joined by outer and inner side walls 64 and 65 to the upward extensions of the outer and inner rear walls 23 and 24 to form a syrup dispenser compartment 66 closed by a top member 67. The latter is provided with a framed opening 68 for the insertion of syrup dispensers, generally designated 69. The latter and their details form no part of the present invention and are of conventional construction. They consist of tanks 70 with tops 71 having apertures (not shown) closed by disc-like plates 72 which support bushings 73 for plungers 74 operating in elongated cylinders 75 extending downwardly into the tanks 70. The cylinders 75 are connected to nozzles 76 in such a manner that when the operator applies downward pressure upon the handle 77 of the plunger 74, this action forces the syrup or other liquid in the tank 70 upward and outward through the nozzle 76.

The bottom of the chamber 66 is closed by a partition 78 of heat-conducting material, such as metal, separating it from the compartment 38, so that heat transfer will occur therebetween. The partition 78 is provided with apertures 79 and 80 (Figure 4) from which open-topped air circulating tubes 81 and 82 extend upward. The tubes 81 and 82 are short and long respectively so as to facilitate the circulation of air by convection between the compartments 38 and 66. Consequently, when the compartment 38 is refrigerated by the action of the refrigerating unit 12, the heat is withdrawn from the syrup dispenser compartment 66 by conduction through the partition 78 and also by circulation of air through the tubes 81 and 82. In this manner, the refrigeration of the compartment 38 also brings about refrigeration of the compartment 66.

Hitherto, the servicing of the refrigerating unit 12 has been a difficult task because of its inaccessibility and difficulty of removal. In the present invention, however, when repairs to the refrigerating unit 12 are needed, these are quickly and easily effected by merely removing the door 28 by taking out the fasteners 61, and uncoupling the couplings 56 (Figure 5). The ice cream cans and container 40 having been removed from the compartment 38, the refrigerating unit 12 is then rolled forward through the opening 27 while traveling upon the rollers 60, and removed from the apparatus. The refrigerating unit 12 is easily rolled along the floor and repaired on the spot or removed to a vehicle for transport to a repair shop. In this manner, the servicing costs have been reduced and the period of inoperativeness of the dispensing apparatus 10 correspondingly reduced. When such a dispensing apparatus, commonly termed a soda fountain, incurs a breakdown in the refrigerating system, it is very important that the period required for repairs be reduced to a minimum and that the apparatus be restored to its operating condition at the earliest possible moment, because of the perishability of the articles dispensed. The present invention also enables a substitute refrigerating unit 12 of the same type to be inserted by rolling it into the chamber 38 through the opening 27 and coupling it to the pipes 57 by the couplings 56. In this way, the dispensing apparatus 10 and particularly the ice cream and syrup dispensing units 11 and 13 inclusive are restored to operativeness without substantial interruption other than the short time required to uncouple and remove one refrigerating unit 12 and substitute another. Repairs on the removed refrigerating unit 12 may then be made at leisure. In the same manner, a new refrigerating unit 12 may be permanently substituted for an old refrigerating unit of the same type, where the latter has become permanently beyond repair.

Refrigeration equalizers

Figure 7:
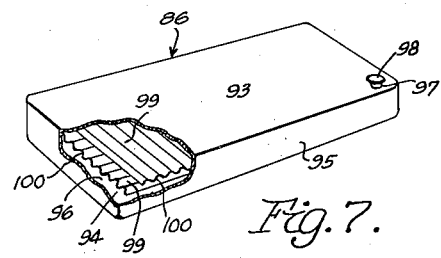
Figure 7 is a perspective view, partly broken away, of a further modification of a refrigerating equalizing device which may be substituted for the refrigerating equalizing device shown in Figure 6.
Figure 6:
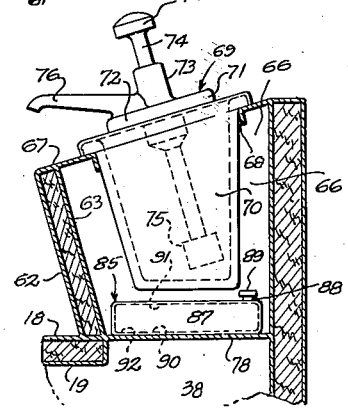
Figure 6 is an enlarged vertical section through a syrup compartment and refrigerating equalizing device which is a modification of that shown in the upper part of Figure 4.

In order to evenly distribute the refrigerating effect throughout the syrup dispenser compartment 66 and to prevent the latter from being cooled to too low a temperature, the refrigeration modulators 85 and 86 of Figures 6 and 7 are provided. The modulator 85 consists of an elongated tank 87 having a filling spout 88 closed by a cap 89 and having a chamber 90 for containing a low freezing liquid, such as a solution of calcium chloride. Thus, when the temperature of the partition 78 is lowered by the action of the refrigerating unit 12 (Figure 6), this extracts heat from the liquid in the modulator 85 and the latter levels out inequalities in the temperature of the partition 78 and causes the upper wall 91 to have a more even distribution of temperature than exists at the lower wall 92 which is in contact with the partition 78.

Where the modulator 85 permits too great a drop in temperature in the syrup dispenser compartment 66 (Figure 6), the modulator 86 is employed (Figure 7). This is generally similar in shape to the modulator 85 and is an elongated box-like container with upper and lower walls 93 and 94 respectively and side walls 95 enclosing a chamber 96. A filler spout 97 and cap 98 are provided in the event that it is desired to employ the same container for a liquid. Ordinarily, however, the chamber 96 of the modulator 86 is maintained in a dry condition containing only air or another gas. In order to retard the transfer of heat between the upper and lower walls 93 and 94, insulating members 99 are provided, these being preferably of metal foil, such as aluminum and having corrugations 100 arranged to cross one another at right angles in successive sheets.

In use, the dry modulator 86 is placed in the same position as the wet modulator 85 in Figure 6. The insulating action of the gas within the chamber 96, coupled with the heat retarding effect of the corrugated members 99, reduces the rate of heat exchange therethrough and consequently causes the chamber 66 to be cooled but not to as low a temperature as the ice cream compartment 38 immediately beneath it on the other side of the partition 78.

*Removable sink*

Figure 2:
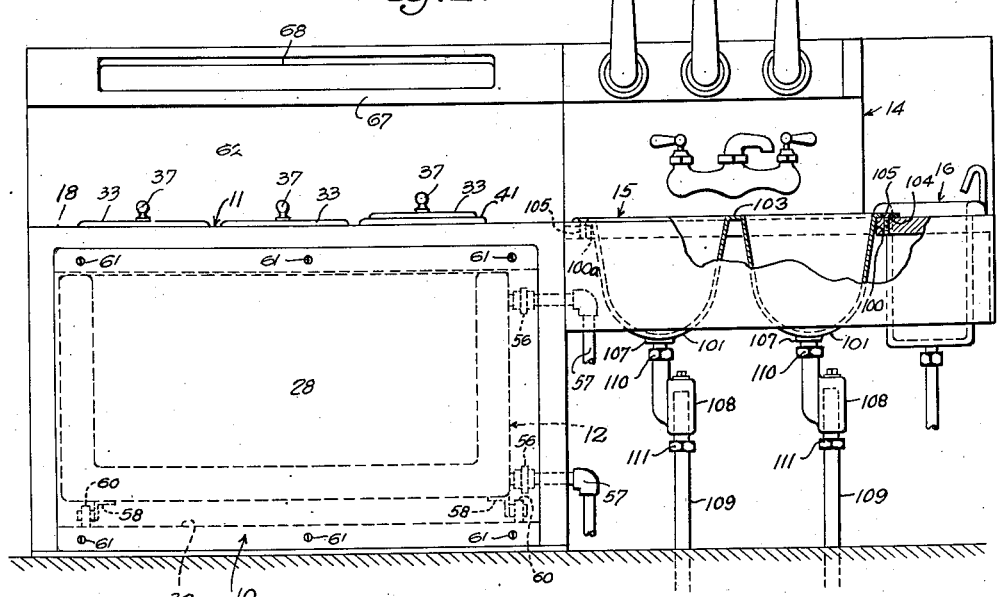
Figure 2 is a front elevation partly in section through the sink, of the dispensing apparatus shown in Figure 1, with the syrup dispensing devices removed.

The sink unit 15 (Figures 1 and 2) is mounted in an aperture 100a in the top portion 17 of the housing 10 and consists of a pair of receptacles 101 integral with a marginal flange 102 and a central dividing flange 103. The marginal flange 102 is provided with holes 104 through which fasteners 105 are inserted to secure the sink unit 15 to the top portion 17. The receptacles 101 are provided with drain holes 106 having connections 107 for conventional sink traps 108 to which are connected the usual drain pipes 109.

To remove the sink unit 15, the traps 108 are disconnected by means of the upper couplings 110 from the connections 107 and the fasteners 105 are removed. The sink unit 15 may then be removed by lifting it vertically out of the aperture 100a and repairs effected or another similar sink unit 15 substituted. If necessary also, the traps 108 may also be removed by unscrewing the lower couplings 111. In the past, the sink units have been made integral with the top portion 17 and repairs were carried out at great difficulties and expense. The sink unit also remained out of operation for long periods of time while these repairs were made. The removable sink unit 15 of the present invention eliminates these disadvantages, by providing quick removal and substitution or replacement thereof.

While I have shown and described my invention in detail, it is to be understood that the same is to be limited only by the appended claims, for many changes may be made without departing from the spirit and scope of my invention.

What I claim is:

1. In a dispensing apparatus for refrigerated articles a housing having walls of heat-insulating material enclosing a refrigerated chamber, said housing having a service opening with a service closure in the top wall thereof and an access opening with an access closure in a vertical wall thereof, a horizontal support in said housing within said chamber, and a drawer-like refrigerating unit in said chamber comprising an open-topped casing slidably mounted on said support and having a refrigerating conduit system carried thereby and movable therewith, said conduit system having separable connections for attachment to an external source of refrigeration whereby to permit removal of said refrigerating unit by disconnecting said connections and sliding said unit along said support through said access opening, said casing having double walls enclosing a cooling compartment with a low-freezing liquid therein and said conduit system being mounted within said compartment and said service opening being located above said casing.

2. In a dispensing apparatus for refrigerated articles a housing having walls of heat-insulating material enclosing a refrigerated chamber, said housing having a service opening with a service closure in the top wall thereof and an access opening with an access closure in a vertical wall thereof, a horizontal support in said housing within said chamber, and a drawer-like refrigerating unit in said chamber comprising an open-topped casing slidably mounted on said support and having a refrigerating conduit system carried thereby and movable therewith, said conduit system having separable connections for attachment to an external source of refrigeration whereby to permit removal of said refrigerating unit by disconnecting said connections and sliding said unit along said support through said access opening, said casing having double walls enclosing a cooling compartment and said conduit being mounted within said compartment with said connections disposed exteriorly of an outer wall of said casing and said service opening being located above said casing.

ISADORE M. KOLIN.

REFERENCES CITED

The following references are of record in the file of this patent:

UNITED STATES PATENTS

| Number | Name | Date |
|---|---|---|
| 1,337,696 | Ewen | Apr. 20, 1920 |
| 1,845,682 | Ruff | Feb. 16, 1932 |
| 2,125,444 | Holderle et al. | Aug. 2, 1938 |
| 2,320,556 | Belshaw | June 1, 1943 |